(12) United States Patent
Edquist et al.

(10) Patent No.: US 11,273,757 B2
(45) Date of Patent: Mar. 15, 2022

(54) AIRCRAFT EMERGENCY LIGHTING SYSTEM

(71) Applicant: B/E AEROSPACE, INC., Winston Salem, NC (US)

(72) Inventors: John Edquist, Milwaukee, WI (US); Jeremy Fredrich, West Allis, WI (US)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

(21) Appl. No.: 16/826,119

(22) Filed: Mar. 20, 2020

(65) Prior Publication Data

US 2021/0291727 A1  Sep. 23, 2021

(51) Int. Cl.
| | | |
|---|---|---|
| *B60Q 3/47* | (2017.01) | |
| *B60Q 3/46* | (2017.01) | |
| *H05B 47/11* | (2020.01) | |
| *B64D 11/00* | (2006.01) | |
| *B64D 47/02* | (2006.01) | |

(52) U.S. Cl.
CPC .......... *B60Q 3/47* (2017.02); *B60Q 3/46* (2017.02); *B64D 11/00* (2013.01); *B64D 47/02* (2013.01); *H05B 47/11* (2020.01); *B64D 2011/0038* (2013.01)

(58) Field of Classification Search
CPC ............ B64D 2011/0038; B64D 47/02; B64D 47/04; B64D 47/08; B64D 2203/00; B64D 2221/00; B60Q 3/46; B60Q 3/47; B60Q 3/51; H05B 47/11
See application file for complete search history.

(56) References Cited

U.S. PATENT DOCUMENTS

| | | | | |
|---|---|---|---|---|
| 6,294,985 B1 * | 9/2001 | Simon | ............. | B60Q 1/525 |
| | | | | 116/173 |
| 6,422,723 B1 * | 7/2002 | Walters | ............. | B60Q 3/16 |
| | | | | 362/183 |
| 7,118,244 B2 * | 10/2006 | Kurtz | ............. | F21S 9/022 |
| | | | | 362/184 |
| 8,567,993 B2 * | 10/2013 | Ten Wolde | ......... | F21V 23/0442 |
| | | | | 362/276 |
| 9,199,824 B2 | 12/2015 | Roussel et al. | | |

(Continued)

FOREIGN PATENT DOCUMENTS

| | | |
|---|---|---|
| DE | 102011018672 | 10/2012 |
| DE | 102014005927 | 4/2015 |

(Continued)

OTHER PUBLICATIONS

European Patent Office, European Search Report dated Aug. 18, 2021 in Application No. 21163384.7.

*Primary Examiner* — Abdullah A Riyami
*Assistant Examiner* — Syed M Kaiser
(74) *Attorney, Agent, or Firm* — Snell & Wilmer L.L.P.

(57) ABSTRACT

An aircraft emergency lighting system is disclosed. This emergency lighting system may include interior emergency lighting, interior ambient light sensors, exterior emergency lighting, and exterior ambient light sensors. The interior emergency lighting, the exterior emergency lighting, or both, may be controlled based upon an input of the interior ambient light condition (e.g., using an output from at least one of the interior ambient light sensors) and based upon an input from at least one of the exterior ambient light sensors.

20 Claims, 7 Drawing Sheets

(56) References Cited

U.S. PATENT DOCUMENTS

| | | | |
|---|---|---|---|
| 9,932,128 B1 | 4/2018 | Volny et al. | |
| 10,206,259 B2 | 2/2019 | Burmeister et al. | |
| 2002/0107694 A1* | 8/2002 | Lerg | G08B 15/00 704/273 |
| 2007/0220667 A1* | 9/2007 | Kanetis | E04H 4/065 4/501 |
| 2009/0165200 A1* | 7/2009 | Kanetis | E04H 4/084 4/498 |
| 2012/0176808 A1* | 7/2012 | Rust | B64D 11/00 362/470 |
| 2015/0091438 A1* | 4/2015 | Hessling Von Heimendahl | B64D 11/00 315/77 |
| 2015/0108895 A1* | 4/2015 | Trinschek | H05B 47/105 315/86 |
| 2015/0274318 A1* | 10/2015 | Hessling Von Heimendahl | H05B 45/3725 315/132 |
| 2016/0152178 A1 | 6/2016 | Peterson et al. | |
| 2016/0221441 A1* | 8/2016 | Hall | H02J 50/502 |
| 2017/0203855 A1* | 7/2017 | Leclear | B64D 47/06 |
| 2017/0223802 A1* | 8/2017 | Vacha | G01J 1/44 |
| 2018/0124899 A1 | 5/2018 | Robinson et al. | |
| 2019/0280039 A1* | 9/2019 | Jia | G06K 9/22 |
| 2020/0039661 A1* | 2/2020 | Ishikiriyama | F21V 23/06 |
| 2020/0160813 A1* | 5/2020 | Aurongzeb | G09G 3/3406 |
| 2020/0260556 A1* | 8/2020 | Rozbicki | H05B 45/22 |

FOREIGN PATENT DOCUMENTS

| | | |
|---|---|---|
| EP | 3002221 | 4/2016 |
| EP | 608886 | 2/2020 |

\* cited by examiner

AIRCRAFT EMERGENCY LIGHTING SYSTEM

FIELD

The present disclosure generally relates to the field of aircraft and, more particularly, to aircraft emergency lighting systems.

BACKGROUND

Almost all aircraft have emergency lighting systems. For example, passenger aircraft have a number of emergency lights, such as emergency exit signs, light strips on the floor, emergency slide lights, and the like. These emergency lights are part of an emergency lighting system.

Conventional aircraft emergency lighting systems include one or more emergency power supplies. The emergency power supplies may be coupled to a trigger line, through which an emergency signal can be transmitted. This emergency signal triggers emergency operation of the emergency power supplies. Upon receiving this trigger signal, each of the emergency power supplies provides power to and activates various emergency lights, which light up.

SUMMARY

An aircraft emergency lighting system is presented herein. Both the configuration of such an aircraft emergency lighting system and the operational characteristics of such an aircraft emergency lighting system are within the scope of this Summary.

The aircraft emergency lighting system may include one or more interior emergency lights, one or more exterior emergency lights, at least one interior ambient light sensor (e.g., associated with an interior of an aircraft), at least one exterior ambient light sensor (e.g., associated with an exterior of an aircraft), an emergency power source, and an emergency lighting system controller. This emergency lighting system controller may be operatively interconnected with one or more of the interior ambient light sensors and one or more of the exterior ambient light sensors. Furthermore, this emergency lighting system controller may control operation of one or more of the interior emergency lights, one or more of the exterior emergency lights, or both, such as by controlling how the emergency power source provides power to the various emergency lights.

Various embodiments include each interior emergency light incorporating an interior ambient light sensor (e.g., an interior emergency light and its corresponding interior ambient light sensor may be integrated into a single structure, such as being disposed in a common housing), include each exterior emergency light incorporating an exterior ambient light sensor (e.g., an exterior emergency light and its corresponding exterior ambient light sensor may be integrated into a single structure, such as being disposed in a common housing), or both. Each interior emergency light may be of any appropriate configuration (including where there are at least two different types of interior emergency lights and for the case of multiple interior emergency lights), and the various interior emergency lights may be distributed in any appropriate fashion throughout the interior of the aircraft. Each exterior emergency light may be of any appropriate configuration (including where there are at least two different types of exterior emergency lights and for the case of multiple exterior emergency lights), and the various exterior emergency lights may be distributed in any appropriate fashion throughout the exterior of the aircraft.

Operation of the aircraft emergency lighting system may be initiated or triggered in any appropriate fashion, such as in response to receipt of a signal indicative of the primary electrical power system for the aircraft having failed, having degraded below an acceptable level, or the like. Any appropriate emergency power supply may be utilized by the aircraft emergency lighting system, such as one or more batteries of any appropriate type and/or configuration. The emergency lighting system controller may control the distribution of power to the various interior emergency lights and the various exterior emergency lights to account for various conditions and/or to realize one or more power management objectives.

For the case where a sensed/determined exterior ambient light condition (based upon the input signal(s) to the controller from the exterior ambient light sensor(s)) is determined by the controller to exceed an exterior ambient light threshold (e.g., a "bright" exterior), and where a sensed/determined interior ambient light condition (e.g., based upon the input signal(s) to the controller from the interior ambient light sensor(s)) is determined by the controller to be below an interior ambient light threshold (e.g., a "dark" interior), the emergency lighting system controller may be configured to one or more of: 1) increase an intensity level of the interior emergency light(s); and 2) to operate the exterior emergency light(s) in one of an off condition or at a minimum intensity.

An interior ambient light condition may be determined from the output of one or more of the interior ambient light sensors. Another way of determining the interior ambient light condition does not require data from any interior ambient light sensors. Instead, the interior ambient light condition may be determined (e.g., by an interior ambient light condition derivation module) from one or more control signal(s) that were used to control one or more interior lights (other than interior emergency lights; e.g., a most recent control signal(s) that was used prior to activation of the emergency lighting system), an output from one or more of the exterior ambient light sensors (e.g., as exterior light may enter the cabin of the aircraft and affect the interior ambient light condition), or both. An "interior ambient light condition source" may be one or more interior ambient light sensors or the noted interior ambient light condition derivation module.

For the case where a sensed/determined exterior ambient light condition (based upon the input signal(s) to the controller from the exterior ambient light sensor(s)) is determined by the controller to exceed an exterior ambient light threshold (e.g., a "bright" exterior), and where a sensed/determined interior ambient light condition (e.g., based upon the input signal(s) to the controller from the interior ambient light sensor(s)) is determined by the controller to exceed an interior ambient light threshold (e.g., a "bright" interior), the emergency lighting system controller may be configured to one or more of: 1) operate the interior emergency light(s) at a maximum intensity; and 2) to operate the exterior emergency light(s) in one of an off condition or at a minimum intensity.

For the case where a sensed/determined exterior ambient light condition (based upon the input signal(s) to the controller from the exterior ambient light sensor(s)) is determined by the controller to be below an exterior ambient light threshold (e.g., a "dark" exterior), the emergency lighting system controller may be configured to one or more of: 1)

operate the interior emergency light(s) at a lower intensity; and 2) to operate the exterior emergency light(s) at a maximum intensity.

Various embodiments have the above-noted exterior ambient light threshold being 0.03 foot-candles (0.3229 lumen per square meter). Various embodiments have the above-noted interior ambient light threshold being 0.05 foot-candles (0.5382 (lumen per square meter).

Various aspects are also addressed by the following paragraphs and in the noted combinations:

1. An aircraft emergency lighting system, comprising:
   at least one interior emergency light;
   at least one exterior emergency light;
   an interior ambient light condition source;
   at least one exterior ambient light sensor;
   an emergency power source operatively interconnected with each of said at least one interior emergency light and said at least one exterior emergency light; and
   an emergency lighting system controller operatively interconnected with each of said interior ambient light condition source and said at least one exterior ambient light sensor, wherein said emergency lighting system controller is further operatively interconnected with said emergency power source.

2. The aircraft emergency lighting system of paragraph 1, further comprising a first interior ambient light sensor, wherein said at least one interior emergency light comprises a first interior emergency light, and wherein said first interior emergency light comprises said first interior ambient light sensor.

3. The aircraft emergency lighting system of any of paragraphs 1-2, wherein said at least one exterior ambient light sensor comprises a first exterior ambient light sensor, wherein said at least one exterior emergency light comprises a first exterior emergency light, and wherein said first exterior emergency light comprises said first exterior ambient light sensor.

4. The aircraft emergency lighting system of paragraph 1, further comprising a plurality of said interior emergency lights, wherein each said interior emergency light comprises a separate interior ambient light sensor.

5. The aircraft emergency lighting system of any of paragraphs 1 and 4, further comprising a plurality of said exterior emergency lights, wherein each said exterior emergency light comprises a separate exterior ambient light sensor of said at least one exterior ambient light sensor.

6. The aircraft emergency lighting system of any of paragraphs 1-5, wherein an interior ambient light output of said interior ambient light condition source is an interior ambient light input to said emergency lighting system controller.

7. The aircraft emergency lighting system of any of paragraphs 1-6, wherein an exterior ambient light output of said at least one exterior ambient light sensor is an exterior ambient light input to said emergency lighting system controller.

8. The aircraft emergency lighting system of any of paragraphs 1-7, wherein said emergency lighting system controller is configured to use a sensed exterior ambient light condition from said at least one exterior ambient light sensor to control operation of said at least one interior emergency light.

9. The aircraft emergency lighting system of any of paragraphs 1-7, wherein for a sensed exterior ambient light condition from said at least one exterior ambient light sensor exceeding an exterior ambient light threshold and for an interior ambient light condition from said interior ambient light condition source being below an interior ambient light threshold, said emergency lighting system controller is configured to increase an intensity level of said at least one interior emergency light.

10. The aircraft emergency lighting system of paragraph 9, wherein said emergency lighting system controller is configured to increase said intensity level of said at least one interior emergency light starting from one of a minimum interior emergency light level for said at least one interior emergency light or from a last known state of said at least one interior emergency light.

11. The aircraft emergency lighting system of paragraph 10, wherein said emergency lighting system controller is configured to increase said intensity level of said at least one interior emergency light starting from said minimum interior emergency light level for said at least one interior emergency light or from said last known state of said at least one interior emergency light, whichever is of a higher intensity.

12. The aircraft emergency lighting system of any of paragraphs 9-11, wherein said emergency lighting system controller is configured to rapidly increase said intensity level of said at least one interior emergency light.

13. The aircraft emergency lighting system of any of paragraphs 9-12, wherein said emergency lighting system controller is configured to increase said intensity level of said at least one interior emergency light at a predefined rate.

14. The aircraft emergency lighting system of any of paragraphs 1-7, wherein for a sensed exterior ambient light condition from said at least one exterior ambient light sensor exceeding an exterior ambient light threshold and for an interior ambient light condition from said interior ambient light condition source exceeding an interior ambient light threshold, said emergency lighting system controller is configured to initiate operation of said at least one interior emergency light at a maximum intensity.

15. The aircraft emergency lighting system of any of paragraphs 9-14, wherein said emergency lighting system controller is configured to operate said at least one exterior emergency light in one of an off condition or at a minimum intensity level when said sensed exterior ambient light condition from said at least one exterior ambient light sensor exceeds said exterior ambient light threshold.

16. The aircraft emergency lighting system of any of paragraphs 9-15, wherein said emergency lighting system controller is configured to terminate operation of said at least one interior emergency light in a first condition.

17. The aircraft emergency lighting system of paragraph 16, wherein said first condition is expiration of a programmed time after said emergency lighting system has been activated.

18. The aircraft emergency lighting system of paragraph 17, wherein said programmed time is 10 minutes such that operation of said at least one interior emergency light is terminated after 10 minutes of operation.

19. The aircraft emergency lighting system of paragraph 16, wherein said first condition is a manual activation of a switch operatively interconnected with said at least one interior emergency light.

20. The aircraft emergency lighting system of any of paragraphs 1-7, wherein for a sensed exterior ambient light condition from said at least one exterior ambient light sensor being below an exterior ambient light threshold, said emergency lighting system controller is configured to operate said at least one interior emergency light in a lower intensity state.

21. The aircraft emergency lighting system of paragraph 20, wherein said at least one interior emergency light is initially activated at a first intensity level, and wherein said emergency lighting system controller is configured to progressively reduce said intensity level of said at least one interior emergency light.

22. The aircraft emergency lighting system of paragraph 20, wherein said emergency lighting system controller is configured to operate said at least one interior emergency light at a level that at least generally matches said sensed exterior ambient light condition.

23. The aircraft emergency lighting system of any of paragraphs 20-22, wherein said emergency lighting system controller is configured operate said at least one exterior emergency light at a maximum intensity level.

24. The aircraft emergency lighting system of any of paragraphs 20-23, wherein said emergency lighting system controller is configured to terminate operation of said at least one interior emergency light in a first condition.

25. The aircraft emergency lighting system of paragraph 24, wherein said first condition is expiration of a programmed time after said emergency lighting system has been activated.

26. The aircraft emergency lighting system of paragraph 25, wherein said programmed time is 10 minutes such that operation of said at least one interior emergency light is terminated after 10 minutes of operation.

27. The aircraft emergency lighting system of paragraph 24, wherein said first condition is a manual activation of a switch operatively interconnected with said at least one interior emergency light.

28. The aircraft emergency lighting system of any of paragraphs 1-27, further comprising:
cabin lighting, wherein said emergency lighting system controller is configured to control said cabin lighting in accordance with said at least one interior emergency light.

29. An aircraft comprising the aircraft emergency lighting system of any of paragraphs 1-28.

30. An aircraft comprising a beacon and the emergency lighting system of any of paragraphs 1-28, wherein said emergency lighting system controller is configured to activate said beacon after operation of said at least one interior emergency light has been terminated by said emergency lighting system controller.

31. A method of operating an aircraft emergency lighting system, comprising:
determining a light intensity of a cabin of an aircraft;
executing a monitoring step comprising monitoring a light intensity of an exterior environment of said aircraft; and
controlling operation of at least one interior emergency light for said aircraft, of at least one exterior emergency light for said aircraft, or both, based upon at least one of said determining step and said monitoring step.

32. The method of any of paragraph 31, wherein said controlling step comprises using said monitoring step to control operation of said at least one interior emergency light for said aircraft.

33. The method of paragraph 31, wherein when said monitoring step is used to determine that an exterior ambient light condition exceeds an exterior ambient light threshold and when said determining step determines that an interior ambient light condition is below an interior ambient light threshold, said method further comprises increasing an intensity level of said at least one interior emergency light.

34. The method of paragraph 33, wherein when said monitoring step is used to determine that said exterior ambient light condition exceeds said exterior ambient light threshold and when said determining step determines that said interior ambient light condition exceeds said interior ambient light threshold, said method further comprises operating said at least one interior emergency light at a maximum intensity.

35. The method of any of paragraphs 33-34, further comprising operating said at least one exterior emergency light in one of an off condition or at a minimum intensity level when said monitoring step is used to determine that said exterior ambient light condition exceeds said exterior ambient light threshold.

36. The method of any of paragraphs 33-35, wherein when said monitoring step is used to determine that said exterior ambient light condition is below said exterior ambient light threshold, said method comprises operating said at least one interior emergency light in a lower intensity state.

37. The method of paragraph 36, wherein when said monitoring step is used to determine that said exterior ambient light condition is below said exterior ambient light threshold, said method further comprises operating said at least one exterior emergency light at a maximum intensity level.

38. The method of paragraph 31, wherein when said monitoring step is used to determine that an exterior ambient light condition exceeds an exterior ambient light threshold and when said determining step determines that an interior ambient light condition exceeds an interior ambient light threshold, said method further comprises operating said at least one interior emergency light at a maximum intensity.

39. The method of any of paragraphs 33 and 38, further comprising operating said at least one exterior emergency light in one of an off condition or at a minimum intensity level when said monitoring step is used to determine that said exterior ambient light condition exceeds said exterior ambient light threshold.

40. The method of paragraph 31, wherein when said monitoring step is used to determine that an exterior ambient light condition is below an exterior ambient light threshold, said method comprises operating said at least one interior emergency light in a lower intensity state.

41. The method of paragraph 40, wherein when said monitoring step is used to determine that said ambient light condition is below said exterior ambient light threshold, said method further comprises operating said at least one exterior emergency light at a maximum intensity level.

DETAILED DESCRIPTION

Figure 1:
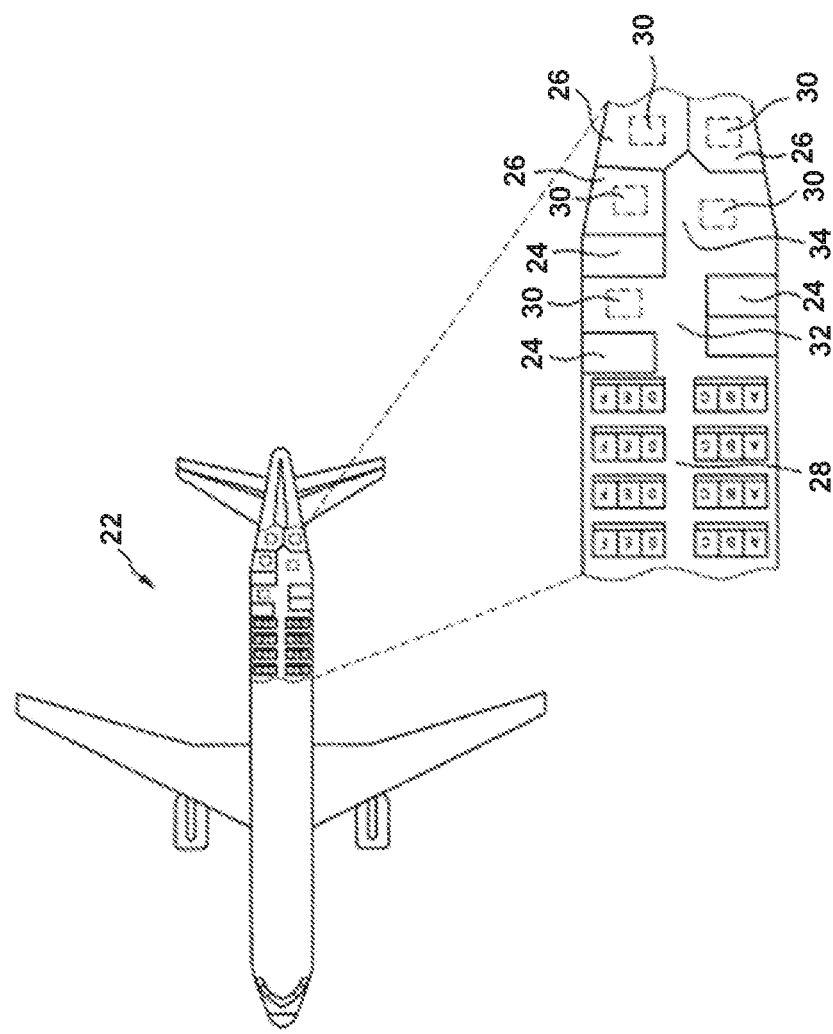
FIG. 1 shows an aircraft, the aircraft being shown in a top view and being shown as partially cut open for illustrating a portion of the interior of the aircraft, which is equipped with a plurality of aircraft cabin lighting arrangements.

FIG. 1 shows an aircraft 22 in accordance with various embodiments. While the aircraft 22, which is a large commercial passenger airplane, is shown in a top view, a rear portion of the aircraft 22 is depicted in a cut-open manner, in order to view the interior of the aircraft 22. In the cut-open portion, a rear end of the seating portion 28 of the aircraft is depicted. In particular, the last four seating rows of the seating portion 28 of the aircraft 22 are shown. In general, the seats of the aircraft 22 and the aisle(s) between the seats are considered the seating portion 28 of the aircraft 22.

Behind the seating portion 28, there are provided three galleys 24 and three washrooms 26. The space in between the galleys 24 is considered the galley area 32. This galley area 32 is predominantly used by the crew members for preparing passenger service, such as food and beverage service, as well as for cleaning up and discarding trash. The space in between the galleys 24 and the washrooms 26 is considered the wash room waiting area 34. This space is predominantly used by passengers when waiting for a washroom 26 or when stretching during long flights. It is possible that the wash room waiting area 34 is also used by the crew members for their various on-board tasks.

The galley area 32, the wash room waiting area 34, and the washrooms 26 are examples of common spaces of an aircraft. The term "common space of an aircraft" refers to a space that is jointly used by various passengers and/or crew members, without being intermediately linked to the seating space. Thus, the aisle(s) may not be considered a common space in the context of the present document. It is a characteristic of the common space of the aircraft that it may be occupied/used by persons at times during the flight, while being void of any persons at other times.

In the cut-open portion of the exemplary aircraft 22 of FIG. 1, there are provided five aircraft cabin lighting arrangements 30 in accordance with various embodiments. One aircraft cabin lighting arrangement 30 is arranged in the galley area 32, one aircraft cabin lighting arrangement 30 is arranged in the wash room waiting area 34, and three aircraft cabin lighting arrangements 30 are arranged in the three washrooms 26. Each aircraft cabin lighting arrangement 30 is provided for illuminating a portion of the common space of the aircraft 22. It is pointed out that the arrangement of the aircraft cabin lighting arrangements 30 is exemplary only and that other arrangements are possible as well. For example, aircraft cabin lighting arrangements in accordance with various embodiments may only be present in a part of the common spaces of the aircraft 22, while another part of the common spaces of the aircraft 22 may be illuminated with other aircraft cabin lights. Also, it is possible to provide a single aircraft cabin lighting arrangement 30 for illuminating various common spaces of the aircraft 22, such as a single aircraft cabin lighting arrangement 30 for illuminating both the galley area 32 and the wash room waiting area 34.

The aircraft cabin lighting arrangements 30 of the exemplary embodiment of FIG. 1 are provided in respective ceiling portions of the aircraft cabin and are therefore depicted in dotted lines in FIG. 1. It is pointed out, however, that one or some or all of the aircraft cabin lighting arrangements 30 may also be arranged in respective wall portions of the aircraft cabin or the wash rooms.

Figure 2:
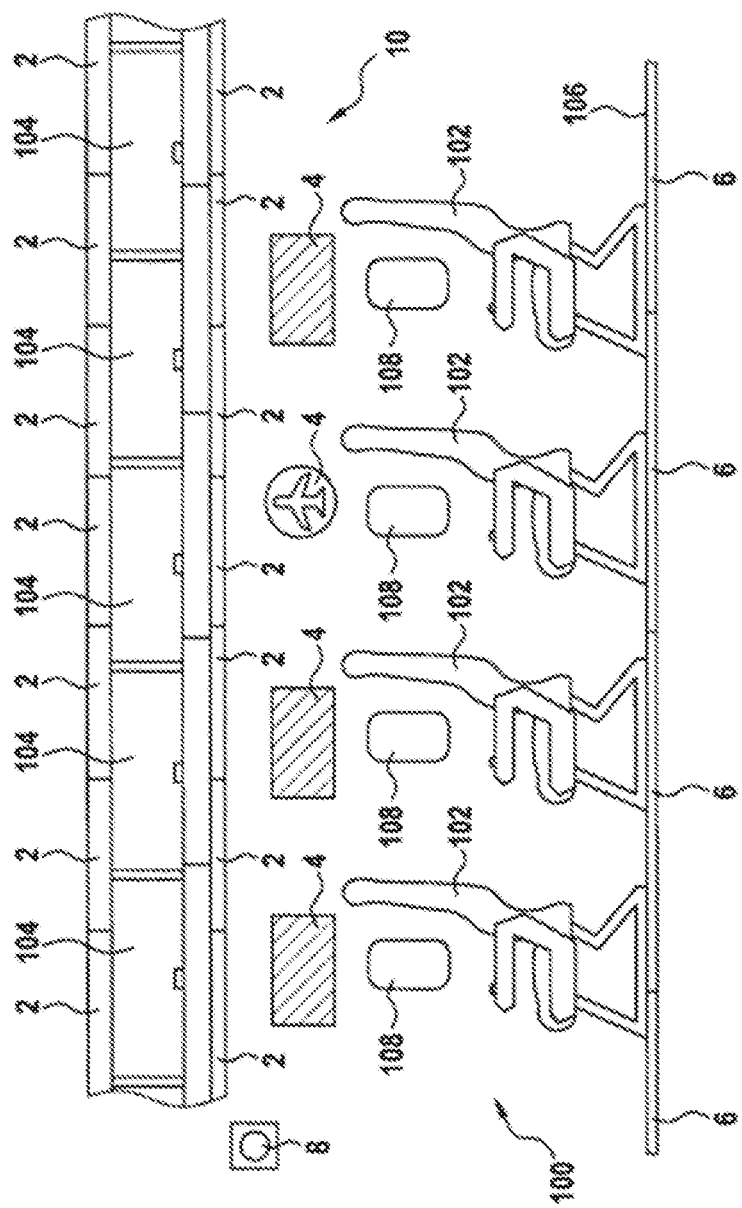
FIG. 2 shows a side view section of an aircraft cabin, equipped with a cabin lighting system.

FIG. 2 shows a section of an aircraft cabin 100, the aircraft cabin 100 being equipped with a lighting system 10 in accordance with various embodiments. The aircraft cabin 100 has those structures/elements that are commonly encountered in an aircraft cabin of a large passenger aircraft. For illustrative purposes, a plurality of passenger seats 102 are depicted. The passenger seats 102 are shown to be arranged on a floor 106 of the aircraft cabin 100. Each of the passenger seats 102 is depicted next to a window 108, which allows the passengers to view the outside of the aircraft. Further, a plurality of overhead baggage compartments 104 are shown, which provide storage space to the passengers.

The lighting system 10 has a plurality of light units 2. In the exemplary embodiment of FIG. 2, two kinds of light units 2 are shown. On the one hand, a plurality of light units 2 are arranged underneath the overhead baggage compartments 104, in particular arranged at the side wall of the aircraft cabin 100 and mounted at least partially between the side wall of the aircraft cabin 100 and the overhead baggage compartments 104. On the other hand, a plurality of light units 2 are arranged on top of the overhead baggage compartments 104, in particular at least partially arranged between the overhead baggage compartments 104 and the ceiling of the aircraft cabin 100. The former kind of light units may be referred to as wall light units, while the latter kind of light units may be referred to as ceiling light units.

The light units 2 have a longitudinal extension along the aircraft cabin 100. In other words, their extension along the length of the aircraft cabin 100 is much greater than their extension in the width-wise and the height-wise dimension of the aircraft cabin 100. In the particular embodiment of FIG. 2, the light units have a length-wise dimension of about 50 cm.

Each of the light units 2 may include a plurality of visible light LEDs, at least one UV LED, and at least one infrared LED. In such a case, each of the light units 2 would be able to emit visible light, UV light, and infrared light. Further in particular, each of the plurality of light units 2 is individually controllable with respect to these different kinds of light output. It is possible for any given light unit 2 to emit one of or any subset of visible light, UV light, and infrared light at any point in time. In other words, each of the visible light emission functionality, the UV light emission functionality, and the infrared light emission functionality may be individually switched on and off for each of the plurality of light units 2. It is, however, pointed out that it is also possible that each of the light units 2 may have infrared lighting functionality only or infrared and visible lighting functionality only.

The exemplary lighting system 10 of FIG. 2 may further include a plurality of indirect illumination regions 4. The indirect illumination regions 4 have photo luminescent paint applied to the side wall of the aircraft cabin 100. In the exemplary embodiment of FIG. 2, the indirect illumination regions 4 have fluorescent paint applied to the side wall of the aircraft cabin. The fluorescent paint emits visible light pursuant to being charged by UV light. The fluorescent paint further has a very fast reaction time, starting and stopping the emission of visible light very shortly after receiving UV light/no longer receiving UV light. For three out of the four depicted indirect illumination regions 4, the photo luminescent paint is applied in a continuous manner across the indirect illumination regions 4, thus forming a continuous source of indirect illumination across the respective indirect illumination regions. The fourth indirect illumination region 4 has photo luminescent paint applied to the side wall of the aircraft cabin 100 in a discontinuous manner. In particular, the photo luminescent paint is applied in a patterned manner, with the pattern representing an airline logo in the exemplary embodiment of FIG. 2. It is apparent that the plurality of indirect illumination regions thus may form sources of uniform indirect illumination or may have any kind of pattern, such as a geometric pattern, a symbol, etc.

The lighting system 10 may further include a plurality of emergency path markings 6, disposed along the floor 106 of the aircraft cabin 100. The emergency path markings 6 are also photo luminescent. In the particular embodiment of FIG. 2, the emergency path markings 6 are phosphorescent. The phosphorescent emergency path markings allow for being charged with UV light and/or visible light and for emitting visible light over an extended period of time, after the charging has been discontinued. The emergency path markings 6 of the exemplary embodiment of FIG. 2 are charged much more rapidly by UV light than by visible light.

Figure 3:
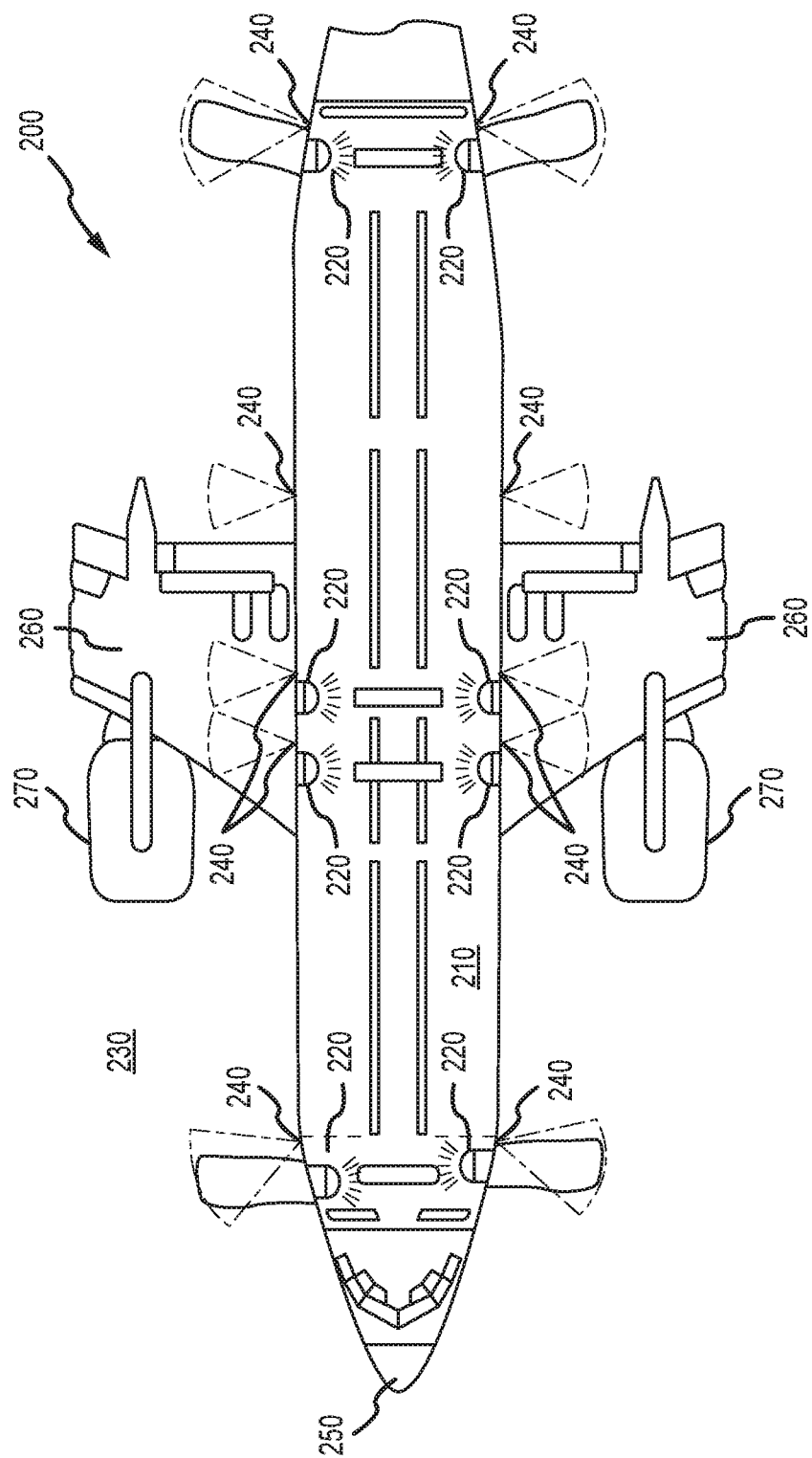
FIG. 3 is a schematic of an aircraft having an aircraft emergency lighting system.

FIG. 3 illustrates an aircraft 200 in accordance with various embodiments. The aircraft 200 includes an interior 210, an exterior 230, a forward end 250, a pair of wings 260, and a plurality of engines 270. A plurality of interior emergency lights 220 are disposed throughout the interior 210 of the aircraft 200, for instance at the various exits from the aircraft 200 (e.g., on each side at a forward location of the aircraft 200; on each side at a rearward location of the aircraft 200; on each side of the aircraft 200 over its corresponding wings 260). A plurality of exterior emergency lights 240 are disposed at various locations on an exterior 230 of the aircraft 200, for instance at the various exits from the aircraft 200 (e.g., on each side at a forward location of the aircraft 200; on each side at a rearward location of the aircraft 200; on each side of the aircraft 200 over its corresponding wings 260). Each of the interior emergency lights 220 and each of the exterior emergency lights 240 may be of any appropriate type and/or configuration. Each interior emergency light 220 and each exterior emergency light 240 used by the aircraft 200 may incorporate a light sensor 360 that will be discussed below in relation to FIG. 4E.

Figure 4A:
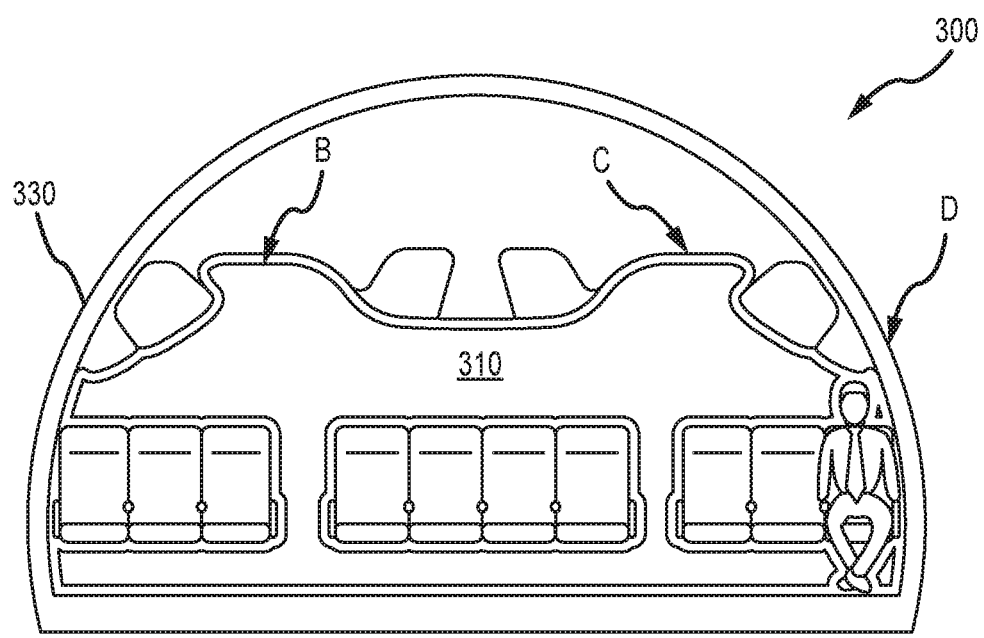
FIG. 4A is a cutaway schematic of an aircraft having an emergency lighting system and a cabin lighting system.
Figure 4E:
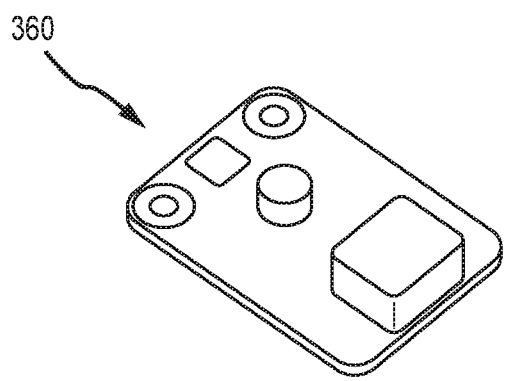
FIG. 4E is an integrated light sensor for a light of an aircraft emergency lighting system.
Figure 4B:
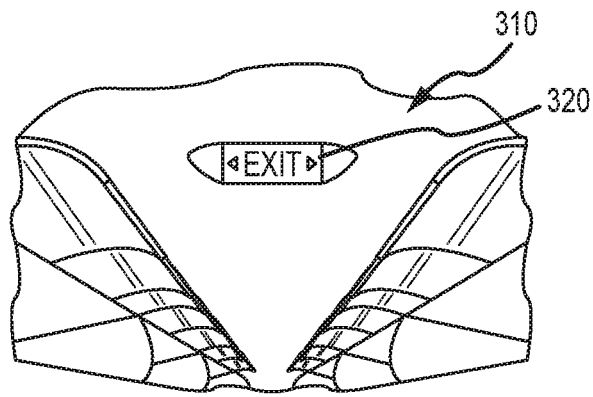
FIG. 4B is a representative interior emergency light for an aircraft emergency lighting system.
Figure 4C:
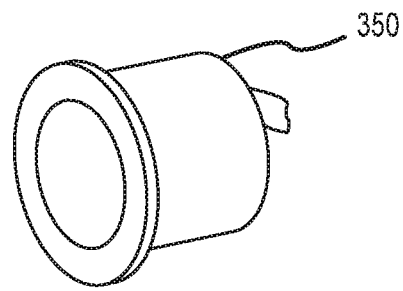
FIG. 4C is a representative cabin light for an aircraft cabin lighting system.
Figure 4D:
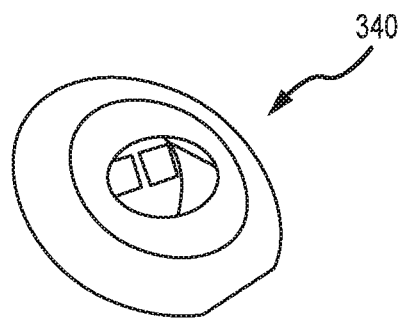
FIG. 4D is a representative exterior emergency light for an aircraft emergency lighting system.

FIG. 4A illustrates an aircraft 300 in accordance with various embodiments. The aircraft 300 includes an interior 310 and an exterior 330. The interior 310 includes a plurality of seats 370 which may be disposed in any appropriate number of rows. Each row may include one more row sections. Arrow B indicates a representative location for an interior emergency light (e.g., emergency light 320 shown in FIG. 4B). Arrow C indicates a representative location for an interior cabin light (e.g., cabin light 350 shown in FIG. 4C). Arrow C indicates a representative location for an exterior emergency light (e.g., exterior emergency light 340 shown in FIG. 4D). A plurality of interior emergency lights may be disposed throughout the interior 310 of the aircraft 300 and in any appropriate arrangement, for instance at the various exits from the aircraft 300 (e.g., on each side at a forward location of the aircraft 300; on each side at a rearward location of the aircraft 300; on each side of the aircraft 300 over its corresponding wings). A plurality of exterior emergency lights may be disposed at various locations on an exterior 330 of the aircraft 300 and in any appropriate arrangement, for instance at the various exits from the aircraft 300 (e.g., on each side at a forward location of the aircraft 300; on each side at a rearward location of the aircraft 300; on each side of the aircraft 300 over its corresponding wings). Each of the interior emergency lights and each of the exterior emergency lights may be of any appropriate type and/or configuration. Each interior emergency light (e.g., interior emergency light 320—FIG. 4B) used by the aircraft 300 may incorporate an ambient light sensor 360 (e.g., FIG. 4E). Each exterior emergency light (e.g., exterior emergency light 340—FIG. 4D) used by the aircraft 300 may incorporate an ambient light sensor 360 (e.g., FIG. 4E). One or more of the cabin lights used by the aircraft 300 (e.g., cabin light 350) may incorporate an ambient light sensor 360 (e.g., FIG. 4E). Each such light sensor 360 may be of any appropriate configuration that monitors/senses corresponding ambient light conditions.

Figure 5:
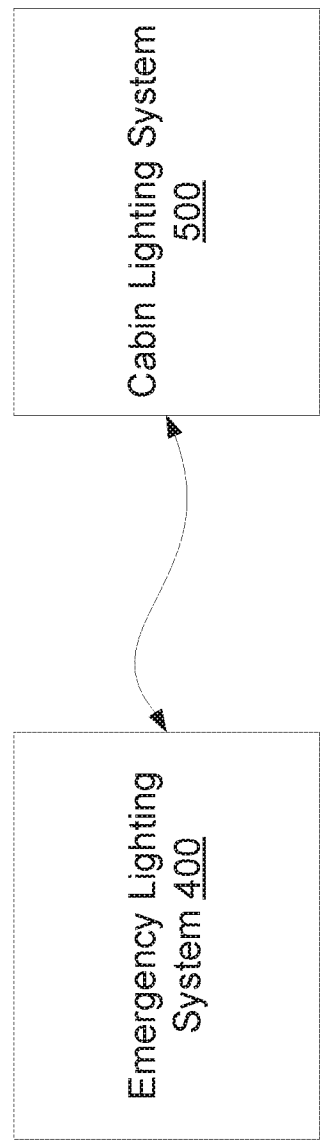
FIG. 5 is a functional schematic illustrating an operative connection between an aircraft emergency lighting system in an aircraft cabin lighting system.

FIG. 5 illustrates an operative connection between an emergency lighting system 400 and a cabin lighting system 500 for an aircraft (e.g., aircraft 200 of FIG. 3; aircraft 300 of FIG. 4A). This operative connection may be in the form of the emergency lighting system 400 monitoring the primary electrical power being provided to the cabin lighting system 500. The emergency lighting system 400 may be automatically activated if the primary electrical power being provided to the cabin lighting system 500 fails, is disrupted to at least a certain degree, or the like.

Figure 6:
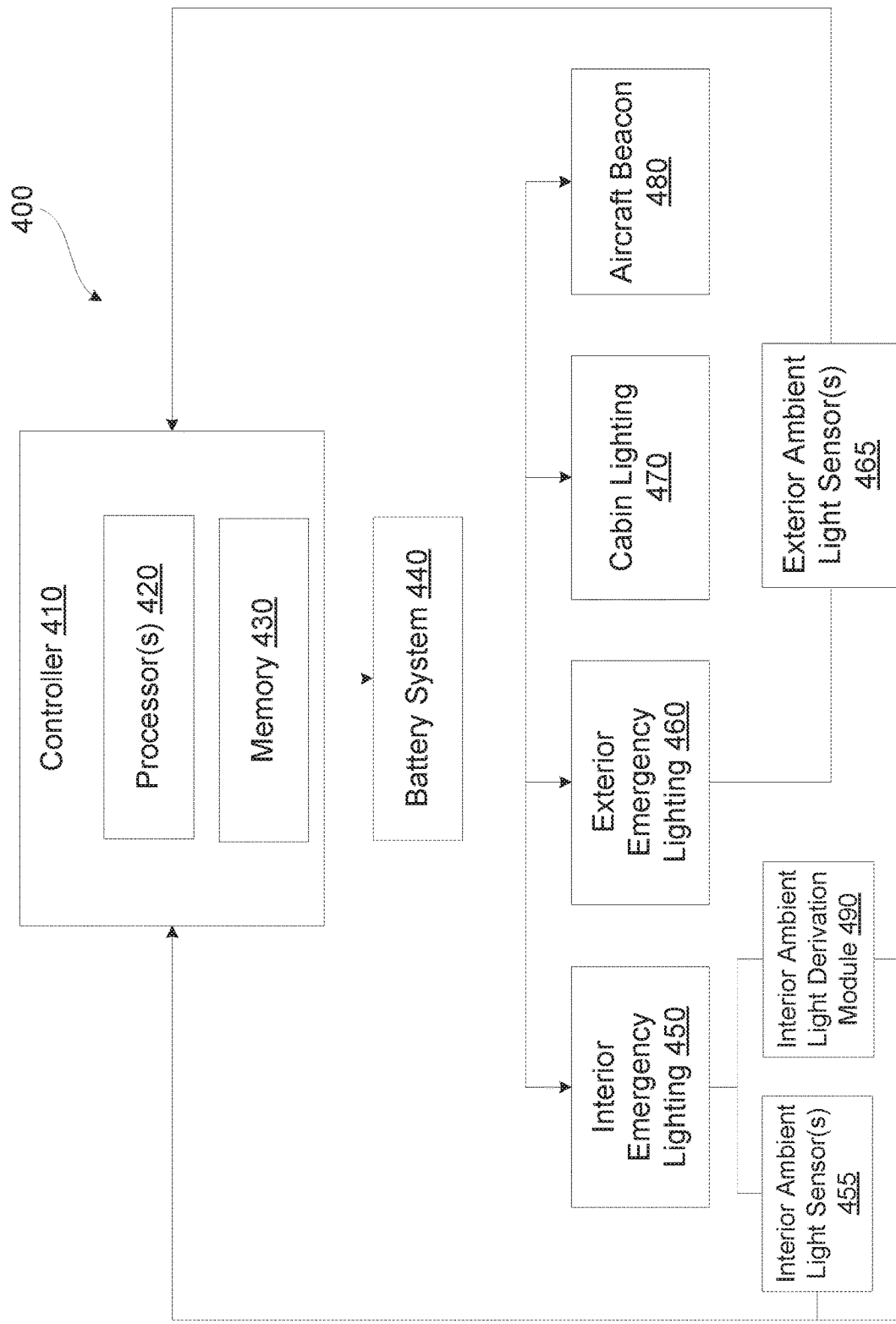
FIG. 6 is a functional schematic of an aircraft emergency lighting system.

Various embodiments of the aircraft emergency lighting system 400 of FIG. 5 are presented in/embodied by FIG. 6. The emergency lighting system 400 of FIG. 6 includes a controller 410. This controller 410 includes one or more processors 420 (which hereafter may simply be referred to as "processor 420"), and memory 430. One or more processors 420 for the controller 410 may be disposed in/utilize any appropriate processing architecture/arrangement. The memory 430 may be of any appropriate type/configuration, may utilize any appropriate data storage architecture/arrangement, and is accessible by the processor 420 of the controller 410 in a manner that will discussed in more detail below.

The controller 410 for the aircraft emergency lighting system 400 is operatively interconnected with an emergency power system 440. The emergency power system 440 may be of any appropriate type and/or configuration, and in various embodiments may include one or more batteries of any appropriate type, configuration, and/or size (such that system 440 may also be referred to herein as a "battery system 400"). Generally, the battery system 440 provides backup or emergency power for the emergency lighting system 400 (e.g., upon failure of the primary electrical power system for the aircraft).

Additional components of the emergency lighting system 400 may include interior emergency lighting 450 (e.g., one or more interior emergency lights in accordance with the foregoing, such as the interior emergency lights 220 for the aircraft 200 of FIG. 3), at least one and typically a plurality of interior ambient light sensors 455 (including where each interior emergency light of the interior emergency lighting 450 includes an integrated/dedicated interior ambient light sensor 455), exterior emergency lighting 460 (e.g., one or more exterior emergency lights in accordance with the foregoing, such as the exterior emergency lights 240 for the aircraft 200 of FIG. 3), at least one and typically a plurality of exterior ambient light sensors 465 (including where each exterior emergency light of the exterior emergency lighting 460 includes an integrated/dedicated exterior ambient light sensor 465), cabin lighting 470 (e.g., one or more cabin lights in accordance with the foregoing (e.g., FIGS. 1 and 2), such as the cabin lights 350 (FIG. 4C) for the aircraft 300 (FIG. 4A)), and an aircraft beacon 480 disposed at one or more locations on the exterior of aircraft that incorporates the emergency lighting system 400.

Operation of the interior emergency lighting 450, the exterior emergency lighting 460, the cabin lighting 470, and the aircraft beacon 480 may be controlled in one or more circumstances by the controller 410 of the aircraft emergency lighting system 400. As will be discussed in more detail below, inputs to the controller 410 of the emergency lighting system 400 include both the ambient lighting condition within the interior of an aircraft that incorporates the emergency lighting system 400 (the interior ambient light sensors 450 may provide inputs to the controller 410) and the ambient lighting condition on the exterior of an aircraft that incorporates the emergency lighting system 400 (the exterior ambient light sensors 465 may provide inputs to the controller 410).

The memory 430 of the emergency lighting system 400 may be configured to include one or more protocols. Each such protocol for the memory 430 (e.g., in the form of computer-readable instructions) may include sensing/monitoring a light intensity within an interior of an aircraft that includes the emergency lighting system 400, determining an interior ambient light condition within an interior of an aircraft that includes the emergency lighting system 400, comparing the interior ambient light condition to a corresponding interior ambient light threshold, sensing/monitoring a light intensity on an exterior of an aircraft that includes the emergency lighting system 400, determining an exterior ambient light condition on an exterior of an aircraft that includes the emergency lighting system 400, and comparing the exterior ambient light condition to a corresponding exterior ambient light threshold. Operation of the interior emergency lighting 415 may be controlled in accordance with the foregoing, operation of the exterior emergency lighting 460 may be controlled in accordance with the foregoing, or both.

Further in accordance with the foregoing, each interior ambient light sensor 455 used by the emergency lighting system 400 may provide a corresponding input to the controller 410 (e.g., at least temporarily stored in memory 430), and each exterior ambient light sensor 465 used by the emergency lighting system 400 may also provide a corresponding input to the controller 410 (e.g., at least temporarily stored in memory 430). One or more interior ambient light thresholds and one or more exterior ambient light thresholds may also be stored in memory 430. The processor 420 may be configured to determine the interior ambient light condition (e.g., based upon the signals received from the interior ambient light sensors 455), and to compare this determined interior light condition to a corresponding interior ambient light threshold in the memory 430. Similarly, the processor 420 may be configured to determine the exterior ambient light condition based upon the signals received from the exterior ambient light sensors 465, and to compare this determined exterior ambient light condition to a corresponding exterior ambient light threshold in the memory 430.

In various embodiments and for the case when a determined exterior ambient light condition in accordance with the foregoing is determined to exceed a corresponding exterior ambient light threshold in the memory 430 (e.g., a "bright" exterior condition), and when a determined interior ambient light condition in accordance with the foregoing is determined to be below a corresponding interior ambient light threshold in the memory 430 (e.g., a "dark" interior condition), a protocol in the memory 430 may be executed by the processor 420 to increase the intensity level of the interior emergency lighting 450, to operate the exterior emergency lighting 460 in one of an off condition or at a minimum intensity level, or both. This protocol in the memory 430 may be configured in various embodiments to increase the intensity level of the interior emergency lighting 450 starting from one of a minimum interior emergency light level for the interior emergency lighting 450 or from a last known state of the interior emergency lighting 450 (e.g., whichever is of a higher intensity). This protocol in the memory 430 may be configured in various embodiments to rapidly increase the intensity level of the interior emergency lighting 450. This protocol in the memory 430 may be configured in various embodiments to increase the intensity level of the interior emergency lighting 450 at a predefined rate (e.g., increased at a time-based rate; increased at a rate that takes into account a desired amount of time that all occupants of should be evacuated from the aircraft). Generally, this protocol may be characterized as attempting to match the lighting conditions within the interior of the aircraft to the lighting conditions on the exterior of the aircraft, which is believed to facilitate evacuation of personnel from the aircraft.

In various embodiments and for the case when a determined exterior ambient light condition in accordance with the foregoing is determined to be above a corresponding exterior ambient light threshold in the memory 430 (e.g., a "bright" exterior), and when a determined interior ambient light condition in accordance with the foregoing is determined to be above a corresponding interior ambient light threshold in the memory 430 (e.g., a "bright" interior), a protocol in the memory 430 may be executed by the processor 420 to operate the interior emergency lighting 450 at a maximum intensity, to operate the exterior emergency lighting 460 in one of an off condition or at a minimum intensity level, or both. Generally, this protocol may be characterized as attempting to match the lighting conditions within the interior of the aircraft to the lighting conditions on the exterior of the aircraft, which is believed to facilitate evacuation of personnel from the aircraft.

In various embodiments and for the case when a determined exterior ambient light condition in accordance with the foregoing is determined to be below an exterior ambient light threshold in the memory 430 (e.g., a "dark" exterior), a protocol in the memory 430 may be executed by the processor 420 to operate the interior emergency lighting 450 at a lower intensity state, to operate the exterior emergency lighting 460 at a maximum intensity level, or both. This protocol in the memory 430 may be configured in various embodiments such that the interior emergency lighting 450 is initially activated at a first intensity level, and thereafter the intensity level of the interior emergency lighting 450 is progressively reduced. This protocol the memory 430 may be configured in various embodiment such that the interior emergency lighting 450 is operated at a level that at least generally matches the sensed exterior ambient light condition. Generally, this protocol may be characterized as attempting to match the lighting conditions within the interior of the aircraft to the lighting conditions on the exterior of the aircraft, which is believed to facilitate evacuation of personnel from the aircraft.

Various embodiments have the above-noted exterior ambient light threshold being 0.03 foot-candles (0.3229 lumen per square meter). Various embodiments have the above-noted interior ambient light threshold being 0.05 foot-candles (0.5382 (lumen per square meter).

Each of the above-noted protocols in the memory 430 may be further configured in various embodiments to terminate operation of the interior emergency lighting 450 in a first condition (e.g., for power balancing purposes regarding the battery system 440). This first condition may be a programmed amount of time after the emergency lighting system 400 has been activated. For instance, operation of the interior emergency lighting 450 may be terminated after 10 minutes of operation. The first condition may also be a manual activation of an appropriate switch (e.g., by the last person leaving the aircraft that includes the emergency lighting system 400). Generally, operation of the interior emergency lighting 450 may be terminated (e.g., to allow power from the battery system 440) after all personnel from within the aircraft should be or have been evacuated.

The cabin lighting 470 shown in relation to the emergency lighting system 400 of FIG. 6 could also be operated in accordance with the interior emergency lighting 450, but such may not be required for various embodiments. Once operation of the interior emergency lighting 450 has been terminated by the controller 410 of the emergency lighting system 400 of FIG. 6, the controller 410 may operate the aircraft beacon 480 using the remaining power in the battery system 440.

The "ambient lighting condition" within the interior of the aircraft and/or on the exterior of the aircraft may be determined in any appropriate manner for purposes of the aircraft emergency lighting system 400 of FIG. 6. The interior emergency lighting 450 of the emergency lighting system 400 may include a plurality of interior emergency lights (e.g., interior emergency lights 220; interior emergency lights 320). Each of these interior emergency lights may include a dedicated light sensor 360 (FIG. 4E) that is integrated into the structure of the corresponding interior emergency light. The output of these light sensors 360 may be used to determine the ambient lighting condition within the interior of an aircraft that incorporates the emergency lighting system 400. For instance, if a predetermined number of these light sensors 360 output the same or a similar ambient light condition, that may be used as the ambient light condition for the interior of the aircraft that incorporates the emergency lighting system 400 for purposes of one or more of the above-noted protocols.

Another way to determine the noted ambient light condition within the interior of the aircraft does not require data from any interior ambient light sensors 455. Modern aircraft cabin lighting systems use a central lighting controller to command the interior lights which provide general cabin illumination. These interior lights include overhead upwash lights, sidewall wash lights, dome lights, accent lights, reading lights, and the like. Since each interior light is commanded by the central lighting controller, the central lighting controller knows the state of each interior light. By knowing the state of each interior light, an interior ambient light derivation module 490 (shown in conjunction with the interior emergency lighting 450 in FIG. 6, but which could be incorporated by the controller 410) may be configured to take the commanded light levels of interior lights providing general cabin illumination and derive the expected interior light levels at least in critical areas used for passenger egress. For example, the interior ambient light derivation module 490 could be configured to determine that if all interior lights are operating at 50% brightness (from an output from the central lighting controller), the interior ambient light derivation module 490 could use this information to determine that the general cabin illumination (the interior ambient light condition) is "XX" lux and which could be provided to/used by the controller 410 in accordance with the foregoing. The module 490 may be configured to receive an input (a percentage brightness signal (e.g., from the central lighting controller) at which one or more aircraft interior lights are being operated, and to use a lookup table or the like that associates this percentage brightness signal with an interior ambient light condition. The interior ambient light derivation module 490 could also be configured to store the minimum brightness level to comply with regulatory requirements for emergency egress, and to use this information to determine/estimate the interior ambient light condition.

Another significant light source in the cabin of the aircraft is coming from outside through the aircraft windows. The output of the exterior ambient light sensor(s) 465 also could be used by the interior ambient light derivation module 490 to derive the amount of light coming into the interior of the aircraft from the outside and which in turn may be used to derive the interior ambient light condition. This could be used by itself for the determination of the interior ambient light condition by the interior ambient light derivation module 490, or in conjunction with the foregoing for derivation by the interior ambient light derivation module 490. For example, the interior ambient light derivation module 490 could be configured such that the internal illumination (within the cabin of the aircraft) from outdoor sources is a predetermined fraction of the external illumination (e.g., if the exterior ambient light condition (e.g., from data acquired by the exterior ambient light sensor(s) 465) is determined to be 100 lux, the interior ambient light derivation module 490 may be configured such that it determines that this corresponds with 5 lux inside the cabin of the aircraft).

The exterior emergency lighting 460 of the emergency lighting system 400 may include a plurality of exterior emergency lights (e.g., exterior emergency lights 240; exterior emergency lights 340). Each of these exterior emergency lights may include a dedicated light sensor 360 (FIG. 4E) that is integrated into the structure of the corresponding exterior emergency light. The output of these light sensors 360 may be used to determine the ambient lighting condition on the exterior of an aircraft that incorporates the emergency lighting system 400. For instance, if a predetermined number of these light sensors 360 output the same or similar ambient light condition, that may be used as the ambient light condition for the exterior of the aircraft that incorporates the emergency lighting system 400 for purposes of one or more of the above-noted protocols.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the present disclosure. Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. An aircraft emergency lighting system, comprising:
   at least one interior emergency light;
   at least one exterior emergency light;
   an interior ambient light condition source selected from the group consisting of at least one interior ambient light sensor and an interior ambient light derivation module;
   at least one exterior ambient light sensor;
   an emergency power source operatively interconnected with each of said at least one interior emergency light and said at least one exterior emergency light; and
   an emergency lighting system controller operatively interconnected with each of said interior ambient light condition source and said at least one exterior ambient light sensor, wherein said emergency lighting system controller is further operatively interconnected with said emergency power source, wherein an interior ambient light condition and an exterior ambient light condition are each available to said emergency lighting system controller to control an intensity level output from said at least one interior emergency light, to control an intensity level output from said at least one exterior emergency light, or both.

2. The aircraft emergency lighting system of claim 1, wherein said interior ambient light derivation module is configured to determine said interior ambient light condition from a control signal to at least one interior light prior to an activation of said aircraft emergency lighting system.

3. The aircraft emergency lighting system of claim 1, wherein said interior ambient light derivation module is configured to determine said interior ambient light condition from at least one of a control signal to an interior light other than an interior emergency light, an output from said at least one exterior ambient light sensor, or both.

4. The aircraft emergency lighting system of claim 1, wherein said emergency lighting system controller is configured to use a sensed exterior ambient light condition from said at least one exterior ambient light sensor to control operation of said at least one interior emergency light.

5. The aircraft emergency lighting system of claim 1, wherein for a sensed exterior ambient light condition from said at least one exterior ambient light sensor exceeding an exterior ambient light threshold and for an interior ambient light condition from said interior ambient light condition source being below an interior ambient light threshold, said emergency lighting system controller is configured to increase an intensity level of said at least one interior emergency light.

6. The aircraft emergency lighting system of claim 5, wherein said emergency lighting system controller is configured to increase said intensity level of said at least one interior emergency light starting from a minimum interior emergency light level for said at least one interior emergency light or from a last known state of said at least one interior emergency light, whichever is of a higher intensity.

7. The aircraft emergency lighting system of claim 5, wherein said emergency lighting system controller is configured to rapidly increase said intensity level of said at least one interior emergency light.

8. The aircraft emergency lighting system of claim 1, wherein for a sensed exterior ambient light condition from said at least one exterior ambient light sensor exceeding an exterior ambient light threshold and for an interior ambient light condition from said interior ambient light condition source exceeding an interior ambient light threshold, said emergency lighting system controller is configured to initiate operation of said at least one interior emergency light at a maximum intensity.

9. The aircraft emergency lighting system of claim 8, wherein said emergency lighting system controller is configured to operate said at least one exterior emergency light in one of an off condition or at a minimum intensity level when said sensed exterior ambient light condition from said at least one exterior ambient light sensor exceeds said exterior ambient light threshold.

10. The aircraft emergency lighting system of claim 1, wherein for a sensed exterior ambient light condition from said at least one exterior ambient light sensor being below an exterior ambient light threshold, said emergency lighting system controller is configured to operate said at least one interior emergency light in a lower intensity state.

11. The aircraft emergency lighting system of claim 10, wherein said at least one interior emergency light is initially activated at a first intensity level, and wherein said emergency lighting system controller is configured to progressively reduce said intensity level of said at least one interior emergency light.

12. The aircraft emergency lighting system of claim 10, wherein said emergency lighting system controller is configured operate said at least one exterior emergency light at a maximum intensity level.

13. The aircraft emergency lighting system of claim 10, wherein said emergency lighting system controller is configured to terminate operation of said at least one interior emergency light in a first condition.

14. The aircraft emergency lighting system of claim 13, wherein said first condition is expiration of a programmed time after said emergency lighting system has been activated.

15. An aircraft comprising a beacon and the aircraft emergency lighting system of claim 1, wherein said emergency lighting system controller is configured to activate said beacon after operation of said at least one interior emergency light has been terminated by said emergency lighting system controller.

16. A method of operating an aircraft emergency lighting system, comprising:
    determining a light intensity of a cabin of an aircraft;
    monitoring a light intensity of an exterior environment of said aircraft; and
    controlling operation of at least one interior emergency light for said aircraft, of at least one exterior emergency light for said aircraft, or both, based upon at least one of said determining step and said monitoring step, wherein each of said determining step and said monitoring step are available to control an intensity level output from said at least one interior emergency light, to control an intensity level output from said at least one exterior emergency light, or both.

17. The method of claim 16, wherein when said monitoring step is used to determine that an exterior ambient light condition exceeds an exterior ambient light threshold and when said determining step determines that an interior ambient light condition is below an interior ambient light threshold, said method further comprises:
    increasing an intensity level of said at least one interior emergency light; and
    operating said at least one exterior emergency light in one of an off condition or at a minimum intensity level.

18. The method of claim 16, wherein when said monitoring step is used to determine that an exterior ambient light condition exceeds an exterior ambient light threshold and when said determining step determines that an interior ambient light condition exceeds an interior ambient light threshold, said method further comprises:
    operating said at least one interior emergency light at a maximum intensity; and
    operating said exterior emergency light in one of an off condition or at a minimum intensity level.

19. The method of claim 16, wherein when said monitoring step is used to determine that an exterior ambient light condition is below an exterior ambient light threshold, said method comprises operating said at least one interior emergency light in a lower intensity state.

20. The method of claim 19, wherein when said monitoring step is used to determine that said exterior ambient light condition is below said exterior ambient light threshold, said method further comprises operating said at least one exterior emergency light at a maximum intensity level.

* * * * *